C. P. BRODHUN.
ELECTRIC CONDUCTING CABLE OR WIRE.
APPLICATION FILED APR. 16, 1917.

1,285,012. Patented Nov. 19, 1918.

Inventor
Carl P. Brodhun,
By
Attorneys

UNITED STATES PATENT OFFICE.

CARL P. BRODHUN, OF WILKES-BARRE, PENNSYLVANIA, ASSIGNOR TO HAZARD MANUFACTURING COMPANY, OF WILKES-BARRE, PENNSYLVANIA, A CORPORATION OF PENNSYLVANIA.

ELECTRIC CONDUCTING CABLE OR WIRE.

1,285,012.   Specification of Letters Patent.   Patented Nov. 19, 1918.

Application filed April 16, 1917. Serial No. 162,430.

*To all whom it may concern:*

Be it known that I, CARL P. BRODHUN, a citizen of the United States, residing at Wilkes-Barre, in the county of Luzerne and State of Pennsylvania, have invented certain new and useful Improvements in Electric Conducting Cables or Wires, of which the following is a specification.

This invention relates to electric conducting cables or wires. It is applicable to cables which are covered with an insulating material, particularly material such as textile or equivalent fibrous or absorbent covering applied by braiding, weaving, winding or otherwise.

As heretofore practised, coverings for cables and the like have been applied without much thought of the consequences which will occur when the covering becomes worn or loosened around the conductor; in a great many instances, particularly where the cables are used, for instance to supply electricity to mine car locomotives, the cables are required to travel over uneven and roughened surfaces, as well as to pass through guideways and the like. This causes considerable wear and tear on the cable and when the covering becomes worn and loose, the several layers, especially the second layer of covering will have a tendency to slip and work the other layers into what might be termed a matted mass or wad, thus making the diameter of the cable so large in some places that it will not pass freely through the guideways and over uneven surfaces encountered in the line of travel. A cable that becomes subject to these conditions causes considerable trouble when it becomes jammed in a guideway, the result being that the insulation is either stripped from the cable or the cable broken.

The object of the present invention is to overcome the disadvantages above outlined by so constructing the cable that it will be impossible for the insulating material to slip or work loose.

The invention is not limited to any particular construction of cable as it may find expression and be employed in any kind of a cable or the like which employs one or more layers of insulating material. The construction and embodiment shown in the accompanying drawings is used merely as an illustration and it is to be understood that the scope of the invention is not limited to the particular showing made. The points of novelty will be set forth in the subjoined claims.

In the drawing:—

Figure 1:
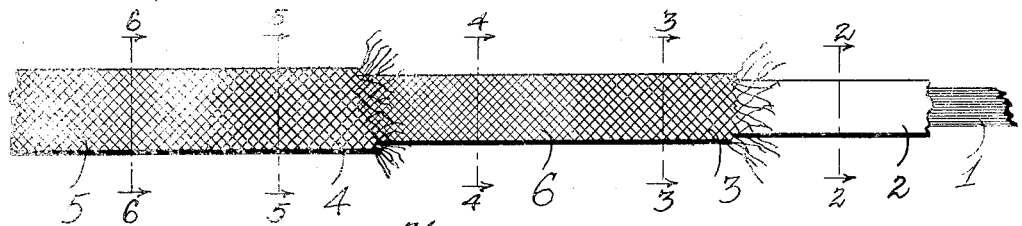
Figure 1 is a side elevation of an electric cable with parts broken away and illustrating the different layers or bindings of insulating material.
Figure 2:
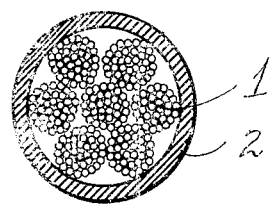
Fig. 2 is a cross sectional view on the line 2—2 of Fig. 1.
Figure 3:
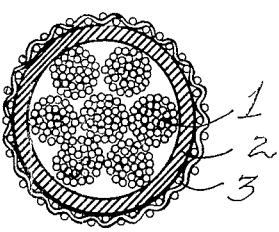
Fig. 3 is a cross sectional view on the line 3—3 of Fig. 1.
Figure 4:
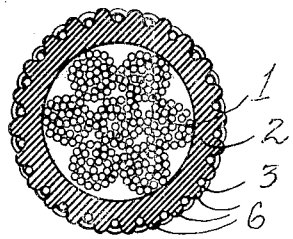
Fig. 4 is a cross sectional view on the line 4—4 of Fig. 1.
Figure 5:
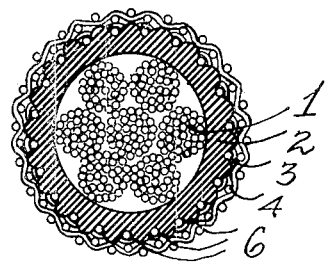
Fig. 5 is a cross sectional view on the line 5—5 of Fig. 1.
Figure 6:
Fig. 6 is a cross sectional view on the line 6—6 of Fig. 1.

An electric cable is generally provided with one or more coverings of protecting and insulating material. In the present showing, the conducting core 1 is shown as having two coverings of insulating material and two coverings or binding layers of textile material. The covering may be applied in the following manner, to wit. First an insulating covering 2 of caoutchouc or minor plastic material is applied to the conducting core 1, then a textile covering 3 is applied to the rubber covering 2 and another covering of textile material 4 is applied over the material 3, then a suitable covering of insulating and waterproofing material 5 is applied over the outer textile covering 4. This method of covering the cable has proven satisfactory so far as the insulating effect goes, but, as heretofore explained, the layers work loose and slip relative to each other. Having in mind the bad effects caused by the slipping of the different layers of covering, the principal feature of the present invention consists in embedding preferably the first covering of textile material, in the present instance designated as 3, in the rubber or insulating covering 2, directly surrounding the conducting core 1. This layer of textile material may be embedded in the insulation 2 in any desired manner, the effect desired to be produced, being to embed the strands of material in the insulating material and cause the insulating material to be squeezed or projected up through the mesh of the textile covering and offer a roughened surface such as 6, which, when the covering 4 is applied, will offer sufficient resistance or frictional contact between the roughened surface 6 and the covering 4 to prevent slipping of the layers relative to each other and the conducting core 1. In some instances it may be desirable to have the textile covering 4 constructed heavier than the covering 3.

I claim:—

1. In an electric cable, a conducting core, an insulation surrounding said core, a covering surrounding said insulation and embedded therein whereby portions of the insulation project beyond said covering.

2. In an electric cable, a conducting core, an insulation surrounding said core, and a covering embedded in said insulation, said covering having openings through which the insulation projects to provide a roughened surface and a second covering embracing said roughened surface.

3. In an electric cable, a conducting core, an insulation surrounding said core, and a covering embedded in said insulation, said covering having openings through which the insulation projects to provide a roughened surface, a second covering embracing said roughened surface and an outer bituminous material surrounding said last-named covering.

The foregoing specification signed at Wilkes-Barre, Pennsylvania, this 3rd day of April, 1917.

CARL P. BRODHUN.